United States Patent
Roote et al.

[11] Patent Number: 5,887,499
[45] Date of Patent: Mar. 30, 1999

[54] METHOD AND APPARATUS FOR DETECTING SHORT PARTS

[76] Inventors: Michael S. Roote, 12935 Rockhaven Rd, Chesterland, Ohio 44026; Eric R. Rataiczak, 1738 Sunview Rd., Lyndhurst, Ohio 44124; James J. Rataiczak, 1038 Winston, South Euclid, Ohio 44121

[21] Appl. No.: 764,971

[22] Filed: Dec. 13, 1996

[51] Int. Cl.$^6$ ..................................................... B23B 13/00
[52] U.S. Cl. ................................. 82/47; 82/126; 82/127; 82/153
[58] Field of Search ................................. 82/47, 46, 48, 82/126, 127, 124, 129, 153; 414/14, 17, 18

[56] References Cited

U.S. PATENT DOCUMENTS

| | | | |
|---|---|---|---|
| 3,285,110 | 11/1966 | Lenkei | 82/153 X |
| 3,678,790 | 7/1972 | Riley | 82/124 X |
| 4,998,455 | 3/1991 | Jauch | 82/127 |
| 5,642,650 | 7/1997 | Roote et al. | 82/126 |
| 5,676,031 | 10/1997 | Manning | 82/153 |

OTHER PUBLICATIONS

Davenport Machine Tool Div, Dover Corp, Rochester, N.Y. Drawing No. D–1263–5–10–SA, Jun. 11, 1991, Stationary Head — Burring Attachment Assembly.

*Primary Examiner*—Frances Han
*Assistant Examiner*—Henry W.H. Tsai
*Attorney, Agent, or Firm*—James A. Rich

[57] ABSTRACT

Short parts are detected on machines where bar stock is fed through one or more work spindles and held in a burring spindle during cut off. The burring spindle contains a sensing rod biased towards the front of the burring spindle and adapted to contact a finished part on the end of the bar stock as the burring spindle moves on to the stock if the part has the proper length. This moves the sensing rod back, with respect to the burring spindle, and a target on the end of the sensing rod enters the sensing field of a proximity sensor. If the burring spindle moves onto a short part, the sensing rod is not moved by the design amount and the target disc does not enter the sensing field of the proximity sensor. The sensor then initiates a short part signal.

21 Claims, 4 Drawing Sheets

METHOD AND APPARATUS FOR DETECTING SHORT PARTS

TECHNICAL FIELD

This invention relates to machine controls and sensors. More particularly, it relates to apparatus for detecting short parts on bar fed machines with burring spindles, pick off spindles or sub-spindles. Representative applications include automatic screw machines, CNC (Computer Numerical Control) lathes and the like.

BACKGROUND

Automatic screw machines, CNC lathes and similar bar fed machines have been used for many years to machine small parts in large volumes. These machines provide a reliable, precise and economical way for producing a wide variety of parts, including air and hydraulic fittings, hose fittings, electrical fittings and connectors, carburetor parts, spark plugs, and various transmission and brake parts including shafts, pins, ABS brake cylinder pistons, screws, gears, splines, grease fittings and the like.

In many of these machines, a bar loader supplies bar stock to a plurality of work spindles mounted on a rotary spindle carrier. The carrier is indexed from work station to work station. Tools such as dovetail and circular form tools, drills, taps, reamers, thread rolls and shave tools, located at the different work stations, perform a variety of machining steps on the bar stock. When the machining sequence has been completed, the finished part is severed from the stock, and the stock is advanced so that the cycle may be repeated.

When a finished part is severed from the stock on a multi-spindle automatic screw machine or other bar fed lathe, it is frequently held in a reciprocating burring or pick-off spindle that supports the finished part as it is being cut off from the bar stock. The burring or pick-off spindle is typically driven by a mechanical cam, air actuator or servo-motor so that a collet or chuck in the end of the spindle is advanced over the finished part (on the end the bar stock extending from the work spindle). The collet or chuck is then closed, thus supporting the part while a cut-off tool separates it from the bar stock. The burring or pick-off spindle is coaxial with and driven at the same speed as the work spindle.

Sometimes when the stock is fed out from the work spindle to advance a new length for machining, the stock fails to advance the correct distance due to slippage in the feeding mechanism. Several methods for detecting this type of short feed have been attempted, including sensors positioned in front of the advancing stock which are designed to be activated only when the stock is fed the correct distance. Unfortunately, merely guaranteeing the stock is fed the correct distance will not ensure that the part is the correct length. Short parts can also be the result of the work piece being pushed back into the collet by any one of the tools performing work on the piece. This can result from a poorly adjusted or worn collet, undersized bar stock, or a worn tool which is applying excessive force to the work piece.

Finished parts are generally deposited in a simple parts basket by the machine when completed. If short fed out stock successfully navigates its way through the tooling stations, a too short part will be deposited in the parts basket along with all the good parts. Many customers will reject a complete order if they find even one part in their shipment not made to the print. To avoid this possibility, many screw machine shops are doing 100% inspection in order to sort out the short pieces from the good ones. This is very expensive. Thus, it is vitally important to be able to detect short parts whenever they occur, and take corrective action.

SUMMARY OF THE INVENTION

This invention provides simple, effective and reliable methods and apparatus for detecting short parts on machines wherein bar stock is fed through work spindles and finished parts on the end of the bar stock are supported in a burring spindle. A sensor rod is mounted within the burring spindle and biased towards the front end of the spindle. This distinguishes this invention from conventional ejectors for this type of burring spindle, which are typically biased toward the rear of the spindle. The sensing rod is positioned to contact the finished part, which is still attached to the end of the bar stock, as the burring spindle moves onto the finished part. If the finished part is of the proper length, the part will hold the sensing rod in a fixed position as the burring spindle completes its movement onto the part. Thus, the sensing rod will be moved toward the rear of the burring spindle.

The rear end of the sensing rod extends from the back of the burring spindle and supports an adjustably mounted target. If the finished part is of the proper length, the relative movement between the sensing rod and the burring spindle places the target disc within the sensing field of a proximity sensor that is mounted for movement with the burring spindle. The proximity sensor then initiates a signal which indicates that the machine is operating properly.

On the other hand, if the finished part is too short, the sensing rod will move forward with the burring spindle beyond the point where the sensing rod should be stopped by a part of proper length. Thus, the target disc will not be within the sensing field of the proximity sensor. The sensor then initiates a short part signal, and preventive actions can be taken either automatically or mechanically.

The systems and procedures disclosed herein provide virtually fool proof methods in apparatus for detecting short parts. The only significant variable is the length of the finished part. Thus, the variables described above which made prior art methods in apparatus for indirectly detecting short parts are no longer a problem. If a malfunction should occur, the result is a short part signal. In other words, the system is fail safe.

Other features and advantages of this invention will be apparent from the following description, which illustrates the simple, effective and dependable methods and apparatus of this invention.

DRAWINGS

DETAILED DESCRIPTION

Figure 1:
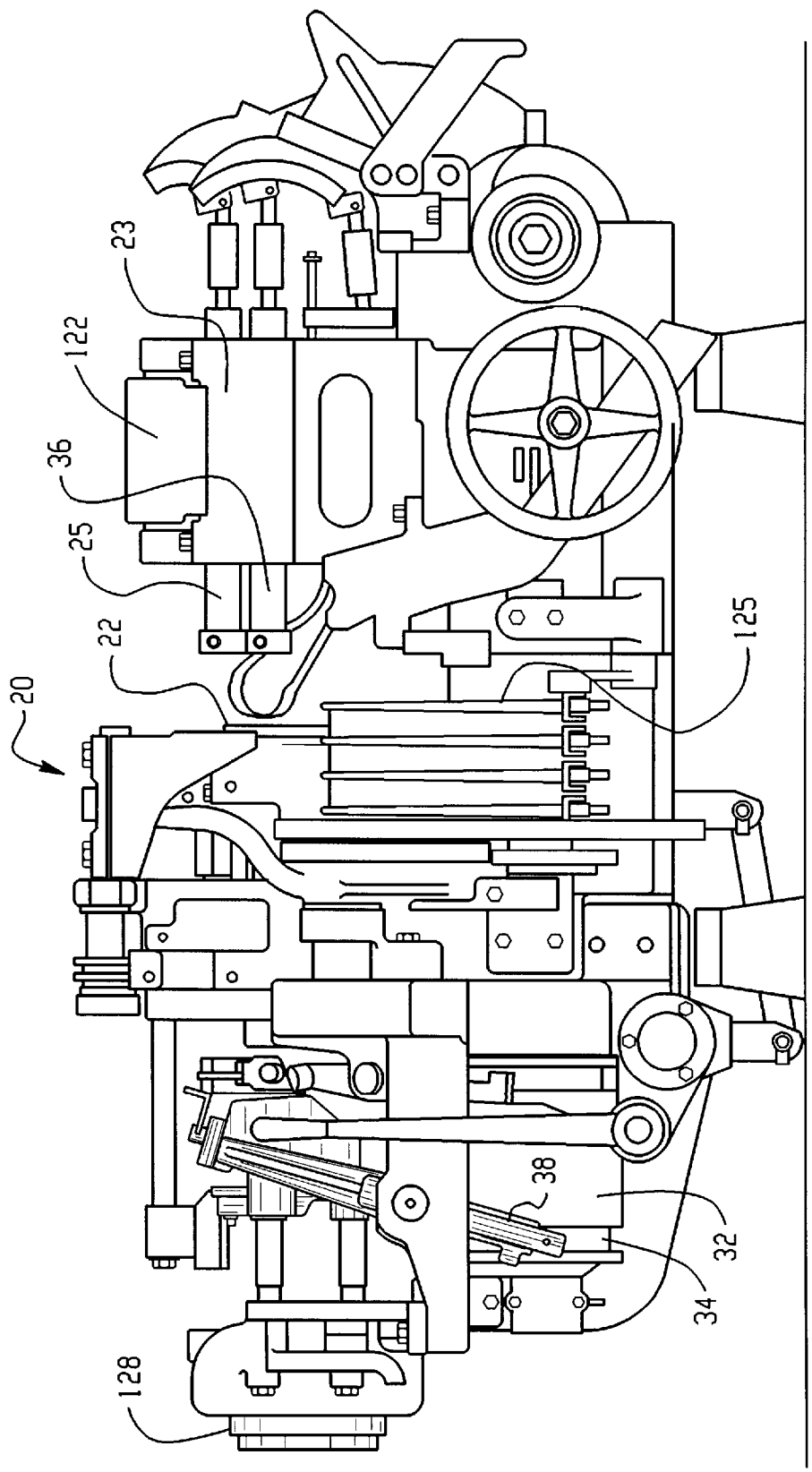
FIG. 1 is a side elevation view of an automatic screw machine in which this invention may be employed.
Figure 2:
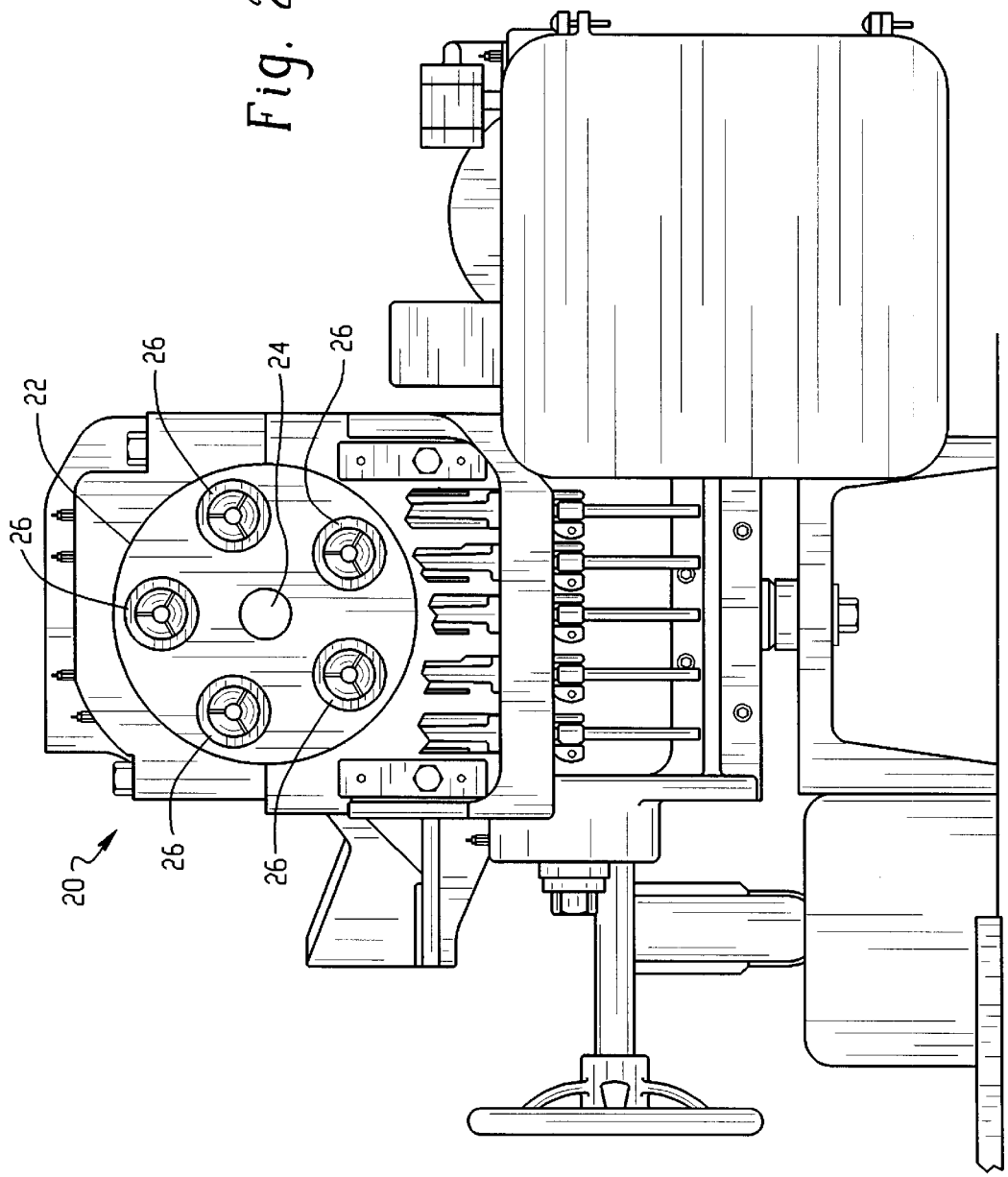
FIG. 2 is an elevation view of the right end of the machine, partially cut-away to show the end of the work spindles and the spindle carrier.

FIGS. 1 and 2 illustrate an automatic screw machine in which this invention may be used. FIG. 1 shows the machine, generally referred to as 20, from the front or operator's position, and FIG. 2 provides a partially cut-away view of the right end of the machine. As shown in FIG. 2, screw machine 20 includes a work spindle carrier or head 22 with five work spindles 26 spaced about the central axis 24 of the work spindle carrier 22. Bar stock is advanced from a bar feeder or a bar feed mechanism (not shown) through the work spindles. Various end-working tools, mounted in tool spindles 25 in stationary head 23, and cross-working tools, mounted in tool slides in tool arms 125, perform a variety of machining operations on the bar stock extending from the work spindles 26.

Between machining operations, the work spindles are indexed counter-clockwise, as viewed in FIG. 2, from the right hand side of the machine in FIG. 1, through a series of five work stations, corresponding to the positions of the spindles in FIG. 2. The position at the top of the Figures is commonly referred to as position number 4, the position at approximately 10 o'clock in FIG. 2 is referred to as position number 5, the position at approximately 7 o'clock is referred to as position number 1, and so forth.

Figure 3:
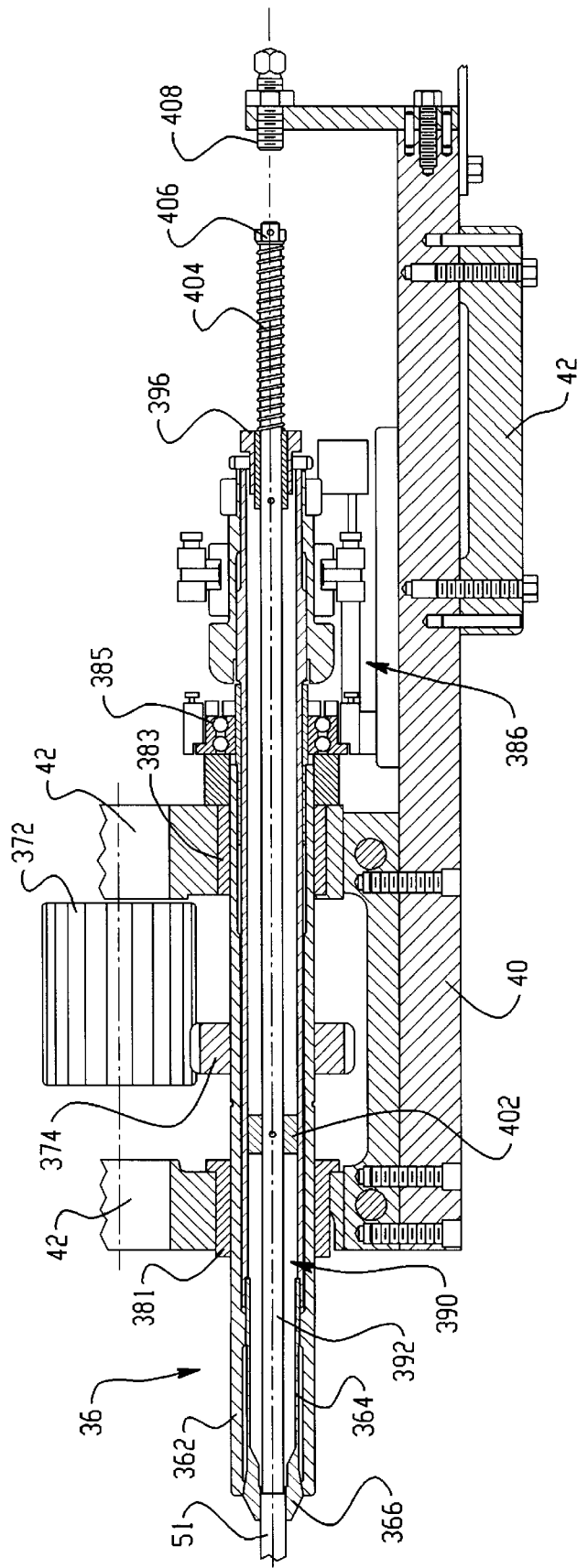
FIG. 3 is a cross-sectional top view of a conventional burring spindle.
Figure 4:
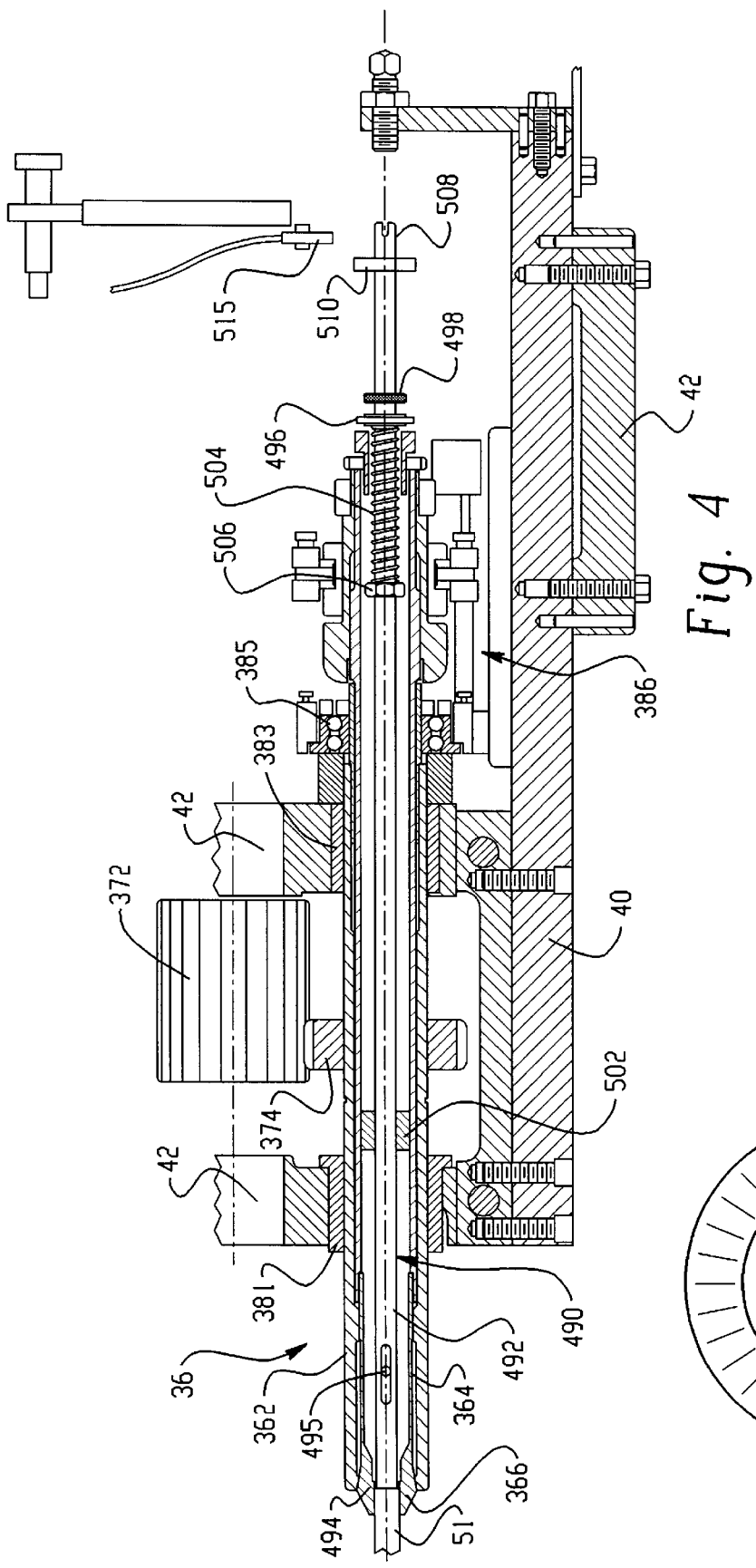
FIG. 4 is a cross-sectional top view of a burring spindle with the short part sensor of this invention.

A burring spindle 36, shown in FIGS. 1, 3 and 4, is axially aligned with the work spindle 26 at position number 5. Burring spindle 36 includes an outer spindle 362, an inner spindle 364, and a chuck or collet assembly 366 attached to the front end of the inner spindle 364. The chuck 366 is adapted to grip a finished part 51, which is still attached to the end of the bar stock in the work spindle 26 at position number 5, and to support the finished part while it is cut off.

The burring spindle 36 is rotated by gears 372, 374 at the same rate of rotation as the work spindle 26. Driving gear 372 has a relatively long axial length so that the driven gear 374 can slide along the driving gear 372 as the burring spindle moves back and forth.

Outer spindle 362 is mounted for reciprocating movement within two bushings 381, 383 mounted in the frame 42 of the machine 20. The burring spindle is also supported by, and rotates within, a thrust bearing 385 mounted on a slide 386, which moves over a longitudinally extending platform 40, bolted to frame 42, as the burring spindle moves to the rear.

The conventional burring spindle shown in FIG. 3 has an ejector 390 that pushes the finished part from the burring spindle when it is pulled back at the end of the cut-off cycle, by a spring return cam (not shown). Ejector 390 has a rod 392 that extends from the chuck 366, through and out the rear of the burring spindle 36. The ejector rod 392 is supported by a bushing 396 threaded into the rear end of the inner spindle 364 and by a bushing 402 mounted for reciprocal movement within the inner spindle. A coil spring 404 around the rear-end of the rod presses on the bushing 396 and on a collar 406 at the outer end of ejector rod 392. When the burring spindle is moved back, the chuck is opened and releases the finished part. The collar 406 on the end of the ejector rod hits a stop screw 408 before burring spindle completes its travel. As the burring spindle continues to move to the rear, the tip of the ejector rod pushes the finished part from the chuck.

FIG. 4 illustrates a burring spindle 36 equipped with the short part sensor 490 of this invention. Like the ejector 390 illustrated in FIG. 3, short part sensor 490 has a rod 492 which extends for substantially the entire length of the burring spindle and extends therefrom. The short part sensor is supported by a jam nut 498 and knurled nut 496 threaded into the inner spindle 364 and by a bushing 502 mounted for reciprocal movement inside the inner spindle. However, on the short part sensor of this invention, the sensor rod 492 is biased by a coil spring mounted inside the burring spindle. Coil spring 504 pushes against a spring stop 506 and against the jam nut 496. Thus the sensor rod 492 is biased towards the front of the burring spindle, instead of towards the rear of the spindle as with conventional ejector rods. When the burring spindle moves forward and grips a finished work piece of the proper length, sensor rod 492 is pushed back within the burring spindle and a target consisting of a disc 510, typically of brass, is forced backward into the sensing field of an inductive switch or sensor 515 such as a Telemecanique Inductive Sensor Model No. XSIN05NA310. Sensor 515 provides a signal that indicates that the finished part has the correct length.

Figure 5:
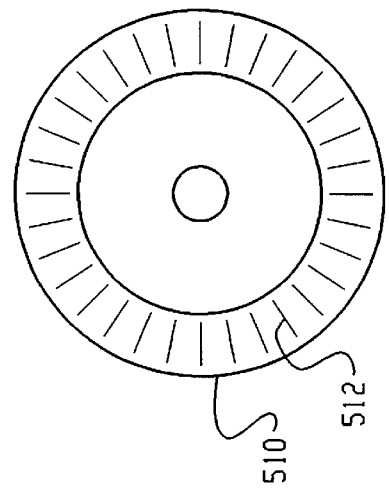
FIG. 5 is an end view of the adjustable sensing target on the short part sensor shown in FIG. 4.

Target disc 510 is mounted on a threaded section 508 at the rear end of the sensor rod. Preferably, the threaded area has a pitch of about 50 threads/inch. Also, as may be seen in FIG. 5, disc 510 has indicator marks 512 that may be used to provide a precise indication of the position of the target disc. This facilitates precise adjustment of the sensor assembly for different parts. With the illustrated target disk, having 20 indicator marks 512, this system can detect variations in length as small as 0.001".

Further adjustment is provided by replaceable contact tips 494 which are secured by dowel pins 495 at the front of the sensor rod 492. These contact tips may be specifically machined for individual work pieces. For example, a contact tip could be provided with a small point adapted to fit an opening at the end of the work piece.

If a short part enters the burring spindle, the sensor rod will not be fully compressed and the target will not activate the inductive sensor, which is indicative of a short part. This indication may be used to direct the part to a reject bin or take other corrective action.

When the sensor rod is compressed, it remains in this position until the chuck is opened by a chuck opening dog on the burring spindle cam (not shown). The pressure exerted on the finished work piece by the sensor rod, typically about 5 lbs, is sufficient to eject the finished part from the burring spindle. If the finished part should become lodged in the chuck, the part will be ejected in the conventional manner when the end of the sensor rod contacts stop screw 408.

Those skilled in the art will readily appreciate that the short part sensor depicted and described herein provides a simple, effective and reliable method and apparatus for detecting short parts and avoiding all the problems and expense that they may cause. Of course, as those skilled in the art will also readily appreciate, many modifications may be made to the system disclosed herein. For example, with suitable instrumentation, this system can be used to measure the length of finished parts. These and other modifications may be made within the scope of this invention, which is defined by the following claims.

We claim:

1. A bar-fed metal working machine comprising:
one or more work spindles, means to feed bar stock through said work spindles, and one or more tools adapted to perform machining operations on bar stock extending from said work spindles;
a burring spindle axially aligned with one of said work spindles when said work spindle is positioned to sever a finished part from said stock in a cut-off operation, said burring spindle having an open front end that is adapted to move over said finished part for said cut-off operation; and
a short part sensor mounted within said burring spindle, said short part sensor comprising:

a sensing rod mounted within said burring spindle with a first end of said rod positioned near the front end of said burring spindle and a second end of said rod extending from a back end of said burring spindle;

said sensing rod being:

biased toward said open front end of said burring spindle;

adapted to contact said finished part as said open front end moves over said part for a cut-off operation; and positioned so that said rod will be moved rearwardly as the open front end of the burring spindle moves over the finished part if the finished part has the desired length; and means for detecting a position of a second end of said sensing rod.

2. A machine according to claim 1 wherein the means for detecting the position of said sensing rod comprises a sensing target mounted on the second end of said sensing rod and a proximity sensor positioned and adapted to detect a position of said sensing target.

3. A machine according to claim 2 wherein the sensing target is metallic and said proximity sensor is positioned so that said target enters a sensing field of said proximity sensor as said sensing rod reciprocates with respect to said burring spindle.

4. A machine according to claim 3 wherein said proximity sensor is mounted for reciprocal movement with said burring spindle.

5. A machine according to claim 3 wherein said second end of said sensing rod has a threaded section, said sensing target comprises a disk mounted on said threaded section, and said disk is marked to facilitate axial adjustment of said target.

6. A machine according to claim 1 wherein said sensing rod comprises a removable tip adapted to contact said finished part.

7. A machine according to claim 6 wherein said removable tip is shaped to fit a feature on said finished part.

8. A machine according to claim 6 wherein said removable tip is mounted on the front end of said sensing rod with a dowel pin.

9. A machine in accordance with claim 1 wherein:

said burring spindle comprises a chuck and means to open said chuck at the end of a cut-off cycle; and said sensing rod is biased toward the front end of said burring spindle with sufficient pressure to expel a finished part from said burring spindle when said chuck is opened.

10. A sensor for indicating the length of a finished part on a bar fed machine having at least one rotary work spindle and a burring spindle axially aligned with one of said work spindles, said burring spindle having an open front end that is adapted to move over a finished part on an end of bar stock extending from said work spindle, said sensor comprising:

a sensing rod mounted within said burring spindle with a first end of said rod positioned near the front end of said burring spindle and a second end of said rod extending from a back end of said burring spindle;

said sensing rod being:

biased toward said open front end of said burring spindle;

adapted to contact said finished part as said open front end moves over said finished part for a cut-off operation; and positioned so that said rod will be moved rearwardly as the open front end of the burring spindle moves over the finished part if the finished part has the desired length; and means for detecting a position of a second end of said sensing rod.

11. A sensor according to claim 10 wherein the means for detecting the position of said sensing rod comprises a sensing target mounted on the second end of said sensing rod and a proximity sensor positioned and adapted to generate a signal that is indicative of the position of said sensing target.

12. A sensor according to claim 11 wherein the sensing target is metallic and said proximity sensor is positioned so that said target enters a sensing field of said proximity sensor as said sensing rod reciprocates with respect to said burring spindle.

13. A sensor according to claim 12 wherein said second end of said sensing rod has a threaded section, said sensing target comprises a disk mounted on said threaded section, and said disk is marked to facilitate axial adjustment of said target.

14. A sensor according to claim 10 wherein said sensing rod comprises a removable tip adapted to contact the end of the finished part.

15. A sensor according to claim 14 wherein said removable tip is shaped to fit a feature on the end of the finished part.

16. A sensor according to claim 14 wherein said removable tip is mounted on the front end of said sensing rod with a dowel pin.

17. A method for indicating length of finished parts in a bar fed machine having at least one rotary work spindle and a burring spindle axially aligned with at least one rotary work spindle, said burring spindle having an open front end that is adapted to move over a finished part at an end of bar stock extending from said work spindle, comprising:

positioning a sensing rod within said burring spindle and biasing a first end of said rod toward said open front end of said burring spindle so that said first end contacts said finished part and said sensing rod is moved within said burring spindle as said open front end moves over said finished part; and sensing a position of said sensing rod.

18. A method according to claim 17 wherein the sensing rod comprises a metallic target, said metallic target enters a sensing field of a proximity sensor, and said proximity sensor generates a signal that indicates length of the finished part.

19. A method according to claim 18 wherein said burring spindle moves over a finished part having correct length, said target enters said sensing field, and said proximity sensor initiates a signal that indicates said finished part has the correct length.

20. A method according to claim 18 wherein said burring spindle moves over a finished part that is too short, said target does not enter said sensing field, and said proximity sensor initiates a short part signal.

21. A method of detecting short parts according to claim 17 wherein said finished part is held in a chuck in a burring spindle during a cut-off operation, said chuck releases said part at the end of said cut-off operation, and said finished part is ejected from said burring spindle by said sensing rod.

* * * * *